United States Patent [19]
Montagne

[11] 3,929,539
[45] Dec. 30, 1975

[54] ELASTOMERS ASSOCIATED WITH CORDS OF RADIAL TIRES AT POINTS CLOSE TO AND REMOVED FROM BEADS

[75] Inventor: Jean Bernard Montagne, Cebazat, France

[73] Assignee: Compagnie Generale des Establissements Michelin, raison sociale Michelin & Cie, Clermont-Ferrand, France

[22] Filed: June 21, 1974

[21] Appl. No.: 481,903

Related U.S. Application Data

[60] Continuation of Ser. No. 285,083, Aug. 30, 1972, abandoned, which is a division of Ser. No. 99,371, Dec. 18, 1970, Pat. No. 3,709,277.

[30] Foreign Application Priority Data

Dec. 23, 1969  France .............................. 69.44776

[52] U.S. Cl. ................ 156/123; 156/128; 156/133; 264/315
[51] Int. Cl.² ......................................... B29H 17/02
[58] Field of Search......... 156/110, 123, 133, 128 R, 156/128 I; 152/374, 354–356; 264/315, 316, 326, 36

[56] References Cited
UNITED STATES PATENTS

| | | | |
|---|---|---|---|
| 1,552,950 | 9/1925 | Pushee................................ | 152/374 |
| 1,762,830 | 6/1930 | Mather................................ | 264/315 |
| 2,415,023 | 1/1947 | Novotny........................ | 156/110 A |
| 2,575,249 | 11/1951 | Connell et al. ..................... | 152/354 |
| 2,649,134 | 8/1953 | Steinle ................................ | 152/353 |
| 3,074,455 | 1/1963 | Richey................................ | 152/356 |
| 3,172,445 | 3/1965 | Boussu et al....................... | 152/354 |
| 3,308,007 | 3/1967 | Shepard........................ | 156/110 A |
| 3,405,754 | 10/1968 | Georges et al................ | 156/110 A |
| 3,542,108 | 11/1970 | Rye..................................... | 152/354 |

FOREIGN PATENTS OR APPLICATIONS 1,076,572  10/1954  France............................... 152/354

*Primary Examiner*—Douglas J. Drummond
*Assistant Examiner*—John E. Kittle
*Attorney, Agent, or Firm*—Brumbaugh, Graves, Donohue & Raymond

[57] ABSTRACT

A radial pneumatic tire comprises at least one carcass ply formed of cords. Adjacent to the tire tread, the cords are calendered in an elastomer of a first grade and spaced apart from one another by an elastomer of a second grade. Adjacent to the tire beads, the cords are calendered in and spaced apart by the same elastomer. The calendering and spacing elastomer employed for the cords adjacent to the beads is the same as the calendering elastomer employed for the cords adjacent to the tread.

2 Claims, 3 Drawing Figures

ELASTOMERS ASSOCIATED WITH CORDS OF RADIAL TIRES AT POINTS CLOSE TO AND REMOVED FROM BEADS

This is a continuation of application Ser. No. 285,083, filed Aug. 30, 1972, which is a division of U.S. application Ser. No. 99,371, filed Dec. 18, 1970, now U.S. Pat. No. 3,709,277, issued Jan. 9, 1973.

BACKGROUND OF THE INVENTION

This invention relates to radial-carcass pneumatic tires and, more particularly, to a novel and highly-effective radial pneumatic tire having an improved selection of elastomers associated with the radial cords.

In a tire of this type, the carcass comprises one or more layers of cords arranged in radial planes of the tire. Each layer thus consists of parallel or approximately parallel cords embedded in a layer of bonding elastomer such as rubber that adheres to the cords and fills the spaces between adjacent cords. The connecting layer comes from two thin sheets of rubber between which the cords have been placed in the form of a sandwich and which have been sealed to each other during the manufacture of the tire. In current industrial practice, the same grade of connecting rubber is used for the different plies of the carcass of a tire and in different regions of a given ply.

In certain radial-carcass tires, especially tires having a carcass with very elastic cords, certain defects appear. For example, separation of the carcass cords at the end of the folded-back portion of the carcass plies may be noticed in the beads or in the regions of the sidewalls adjacent to the beads. This is true particularly in the case of the carcass ply that extends farthest up in the sidewall after passing around the steel bead wire.

In many cases also one may observe a tearing of the bonding rubber between cords, along radial lines in the upper region of the sidewall, that is to say, in the region of the sidewall between the tread and the middle of the sidewall. Either or both defects may occur, depending on the modulus of elasticity of the selected bonding rubber.

SUMMARY OF THE INVENTION

An object of the present invention is to remedy the problems of conventional radial tires outlined above and, in particular, to provide a tire having a radial carcass that resists both separation of the carcass cords from the surrounding rubber between the middle of the sidewall and the bead wire and tearing of the bonding rubber between the cords in the upper region of the sidewall.

The foregoing and other objects are attained in accordance with the invention by the provision of a tire with a radial carcass comprising at least one layer of radial cords extending in the sidewalls and around the bead wires. The portions of the cords folded back around the bead wires rise in the direction of the sidewalls and terminate at some distance from the bead wires. In accordance with the invention, the cords are (a) in a region of the sidewalls close to the tread, calendered in or surrounded individually by a first grade of an elastomer such as rubber but spaced apart from one another by a second grade of elastomer such as rubber and (b), in a region of the sidewalls close to the bead wire, surrounded individually and spaced apart from one another by the same grade of rubber or other elastomer.

In an embodiment of the invention applicable especially to radial-carcass tires having cords of relatively elastic material, the cords are calendered in or are surrounded individually by a coating rubber of relatively high modulus and they are spaced apart from one another by a filling rubber that is of relatively low modulus in the upper region of the sidewalls (i.e., in the region adjacent to the tread) and of relatively high modulus in the lower region of the sidewalls (i.e., in the region adjacent to the beads). In the lower region the coating rubber and filling rubber are of the same grade or quality.

The expression "modulus" in the present context relates to the mechanical behavior of rubber under the conditions of use as a tire. It designates either the dynamic modulus or the static modulus at frequencies, temperatures and types and amplitudes of deformation customary in a tire. However, the static modulus of elasticity at 100% elongation and at a temperature of 20°C is sufficient in general to characterize in practice the mechanical behavior of a mix; as a matter of fact, no rubbers are known having clearly different mechanical properties which do not also have substantially different moduli of elasticity at 100% elongation at 20°C.

A method in accordance with the invention for obtaining a tire as disclosed herein comprises the steps of arranging radially within a ply of cords rolled in a rubber of the first grade a layer of rubber of a second grade and then, upon vulcanizing the tire, exerting a tension on the carcass cords.

In the case of a carcass of cords of material such as polyamides or polyesters, the contraction of the cords at the vulcanization temperature is sufficient to place these cords under tension and to cause, in the region remote from the bead wires, as a result of the shortening of the cords, the movement of the cords towards the inside of the tire, partially carrying along their surrounding rubber, as well as their penetration into the layer of rubber of different quality.

The filling rubber for the cords of the carcass ply in question may itself be the rubber surrounding the individual cords of another carcass ply.

BRIEF DESCRIPTION OF THE DRAWING

An understanding of other aspects of the invention can be gained from a consideration of the following detailed description of the preferred embodiments thereof, in conjunction with the accompanying figures of the drawing, wherein.

DESCRIPTION OF THE PREFERRED EMBODIMENTS

Figure 1:
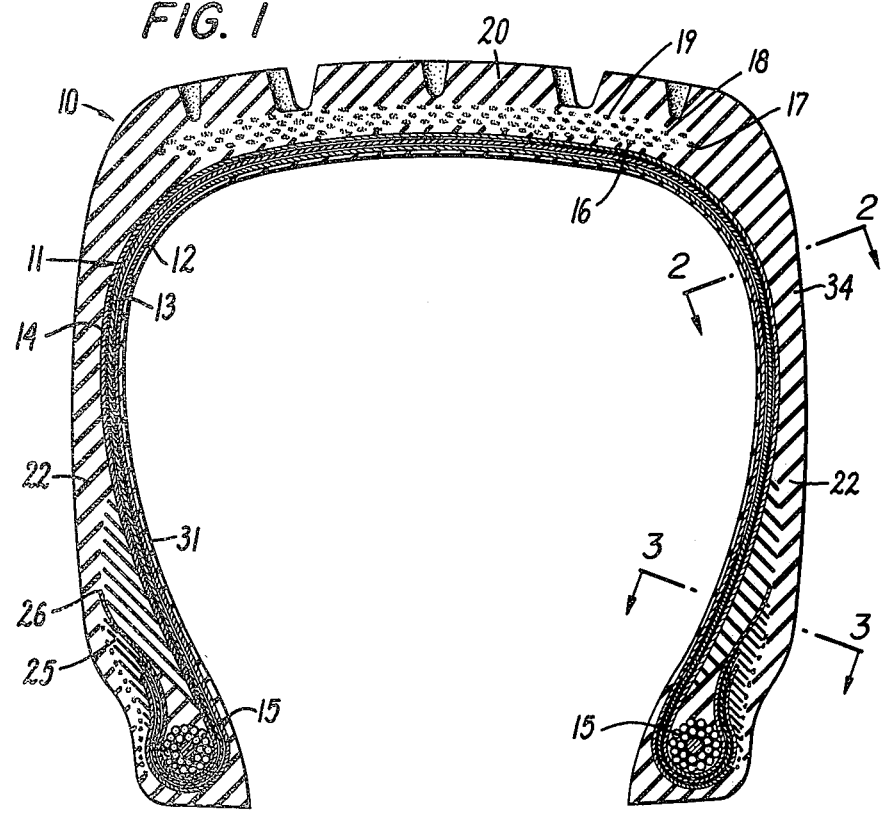
FIG. 1 is a view in radial section of a preferred embodiment of a pneumatic tire in accordance with the invention.

FIG. 1 shows in radial section a tire 10 of size 10.00–20, that is to say, a tire of a rated load of about 2.5 tons.

This tire has a radial carcass 11 composed of three plies 12, 13 and 14 of polyamide composite cords 1680/3. Each composite cord is composed of three individual cords of 1680 denier each. The carcass is anchored around two bead wires 15, each ply being folded back and extending in the direction of the sidewall. The tire comprises furthermore a top reinforcement composed of plies 16, 17, 18 and 19 of steel cords, reinforcing the tread 20.

Figure 2:
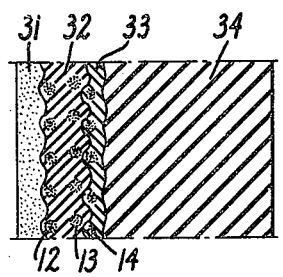
FIG. 2 is a fragmentary view on a larger scale along the line 2—2 of FIG. 1, and looking in the direction of the arrows.
Figure 3:
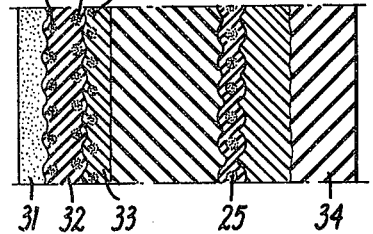
FIG. 3 is a fragmentary view on the scale of FIG. 2 along the line 3—3 of FIG. 1 and looking in the direction of the arrows.

FIGS. 2 and 3 show the sidewalls 22 in cross section perpendicular to the carcass cords, FIG. 2 being a section in the upper region, that is to say, at a slight distance from the tread, and FIG. 3 being a section in the lower region, that is to say, in the vicinity of the end of the folded-back portion 25 of the carcass ply 14 rising farthest in the sidewall. FIGS. 2 and 3 show what can actually be observed on a physical tire section which has been previously ground on the section surface and which is examined in grazing light, that is to say, under conditions which show the different grades of rubber. For the sake of greater clarity, the distances between cords have been somewhat exaggerated.

FIG. 2 shows in succession a layer of rubber 31 forming the inner covering of the tire, a layer of rubber 32 embedding the cords of the plies 12 and 13 and extending between the cords of the ply 14, so that the cords of the ply 14 are spaced apart from one another, a layer of rubber 33 individually surrounding the cords of the ply 14, and a layer of sidewall rubber 34.

In accordance with the invention, the cords of the ply 14 are well surrounded individually by a coating or calendering rubber 33 which is of different grade or quality from the filling rubber 32 by which the cords of the ply 14 are spaced apart from one another. The rubber 32 that is inserted between the cords of the ply 14 is the calendering or coating rubber of the cords of plies 12 and 13.

In FIG. 3 it can be seen that the cords of the ply 14, including the folded-back portion 25, are arranged in the rubber 33 in the same manner as the cords of the plies 12 and 13 are arranged in the rubber 32.

The arrangement of the carcass cords with respect to the different connecting rubbers is due first of all to the fact that the cords of the two inner plies 12 and 13 have been calendered in a rubber 32 of different quality from the calendering rubber 33 of the cords of the outer ply 14. In one embodiment of the invention, the rubber 32 has a modulus of elasticity at 100% elongation of 115 g/mm$^2$ and a dynamic shear modulus at a frequency of 10 cps of $10.0 \times 10^5$ N/m$^2$, while the rubber 33 has a modulus of elasticity of 400 g/mm$^2$ at 100% elongation and a dynamic shear modulus of $102 \times 10^5$ N/m$^2$ at a frequency of 10 cps. Upon the vulcanization of the tire, the polyamide cords contract at a temperature of about 150°C, and a displacement of the cords towards the inside of the tire takes place. The displacement is particularly marked in the upper region of the tire.

Comparative tests have shown the following results:
a. If the three plies 12, 13, and 14 are calendered in the same rubber of high modulus, tears of the rubber between cords in the upper region of the tire appear after relatively few miles of travel.
b. If the three plies 12, 13 and 14 are calendered in the same rubber of low modulus, one avoids the tears of the rubber between cords in the upper region but notes a separation of the cords of the ply 14 at the level of the end 26 of the folded-back portion 25. This separation occurs at the end of a number of miles which varies in a proportion of 1 to 5 or 10 depending on the structure of the folded-back portion of the carcass, as set forth in my copending patent application Ser. No. 99,370 (now U.S. Pat. No. 3,709,276) for "Bead Area Carcass Cord Arrangement for Radial Tires", filed concurrently herewith.
c. If the plies 12 and 13 are calendered in a rubber of relatively low modulus and the ply 14 in a rubber of relatively high modulus, one eliminates both the tears in the upper region and the separations of plies in the lower region even after traveling for very many miles, subject to selecting the most favorable structure for the folded-back portion of the carcass.

Many modifications of the preferred embodiments of the invention disclosed herein will readily occur to those skilled in the art. For example, the invention is not dependent on any particular selection of material for the carcass cords, although the advantages it produces may be greater or lesser, depending on the nature of the material. Also, the present invention and that disclosed in my copending application Ser. No. 99,370 now U.S. Pat. No. 3,709,276, for "Bead Area Carcass Cord Arrangement for Radial Tires", filed concurrently herewith, may be embodied in the construction of the same tire. Accordingly, the invention is to be construed as including all the embodiments thereof within the scope of the appended claims.

I claim:
1. A method of manufacturing a radial pneumatic tire comprising the steps of forming a layer of green rubber stock convertible by vulcanization into a relatively low-modulus rubber, forming a ply of heat-shrinkable cords, calendering said cords with green rubber stock convertible by vulcanization into a relatively high-modulus rubber, providing a pair of bead rings, mounting said ply of calendered cords on said layer of rubber in tire-carcass form with said cords oriented radially and anchored on said bead rings to define two spaced-apart bead regions and, intermediate therebetween, a tread region, and heating said tire to effect vulcanization thereof and to cause said cords to shrink so that said cords and said rubber in which they are calendered penetrate into said layer of rubber adjacent to said tread region, whereby a tire is produced in which said relatively high-modulus rubber calenders said cords adjacent to said tread region, said relatively low-modulus rubber spaces said cords apart from one another adjacent to said tread region, and said relatively high-modulus rubber calenders said cords and spaces said cords apart from one another adjacent to said bead regions.

2. A method according to claim 1 comprising the further step of calendering additional radially-oriented cords in said layer of green rubber stock convertible by vulcanization into a relatively low-modulus rubber.

* * * * *